(12) United States Patent
Van Delden et al.

(10) Patent No.: US 12,004,491 B1
(45) Date of Patent: Jun. 11, 2024

(54) PROTEIN FEEDER TIMED-ACCESS CONTROL SYSTEM

(71) Applicants: Timothy K. Van Delden, New Braunfels, TX (US); Robert E. O'Connor, San Antonio, TX (US)

(72) Inventors: Timothy K. Van Delden, New Braunfels, TX (US); Robert E. O'Connor, San Antonio, TX (US)

(73) Assignee: NEXT GENERATION DEER FEEDERS, L.L.C., New Braunfels, TX (US)

( * ) Notice: Subject to any disclaimer, the term of this patent is extended or adjusted under 35 U.S.C. 154(b) by 0 days.

(21) Appl. No.: 18/545,002

(22) Filed: Dec. 19, 2023

Related U.S. Application Data

(60) Provisional application No. 63/535,659, filed on Aug. 31, 2023.

(51) Int. Cl.
*A01K 5/02* (2006.01)
(52) U.S. Cl.
CPC .......... *A01K 5/0225* (2013.01); *A01K 5/0291* (2013.01)
(58) Field of Classification Search
CPC ............................ A01K 5/0225; A01K 5/0291
See application file for complete search history.

(56) References Cited

U.S. PATENT DOCUMENTS

| | | | | |
|---|---|---|---|---|
| 2,969,893 | A * | 1/1961 | Peeters | G01G 13/00 222/642 |
| 3,423,130 | A * | 1/1969 | Milner | B24B 57/00 406/168 |
| 4,363,291 | A * | 12/1982 | Harmsen | A01K 5/0275 119/51.02 |
| 5,050,770 | A * | 9/1991 | Smiley | B65G 69/181 222/64 |
| D476,451 | S * | 6/2003 | Morgan, Sr. | D30/121 |
| 8,096,265 | B1 * | 1/2012 | Wisecarver | A01K 5/0225 119/56.2 |
| D787,751 | S * | 5/2017 | Bosco | D30/121 |
| 9,743,641 | B1 * | 8/2017 | Attard | A01K 5/0291 |
| 11,602,127 | B1 * | 3/2023 | Swicegood | A01K 5/0225 |
| 2013/0186342 | A1 * | 7/2013 | Salinas | F16K 31/04 119/51.11 |
| 2014/0174368 | A1 * | 6/2014 | Salinas | A01K 5/0291 119/51.11 |
| 2016/0302383 | A1 * | 10/2016 | Frieden | A01K 5/02 |
| 2018/0300662 | A1 * | 10/2018 | Lauve, IV | G06Q 10/1097 |

* cited by examiner

*Primary Examiner* — Ebony E Evans
(74) *Attorney, Agent, or Firm* — CLEARPAT SERVICES, LLC

(57) ABSTRACT

A gravity-fed protein feeder improvement comprising a timed-access control system configured to increase opportunities to attract or harvest a target animal at a protein feeder site during daylight hours, said timed-access control system comprising a programable timer switch, a battery, a solar panel, a feed access control door assembly, an electromagnetic coil relay, a linear actuator, actuator alignment bracket and assembly mount.

18 Claims, 11 Drawing Sheets

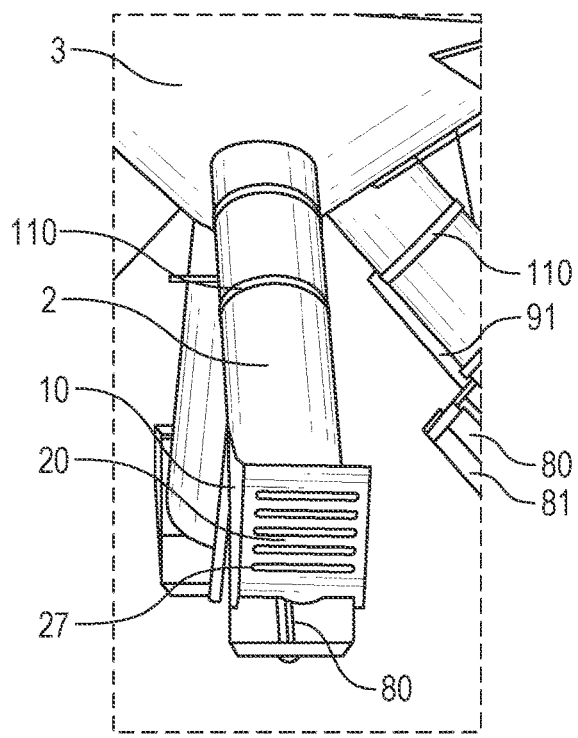
FIG. 3
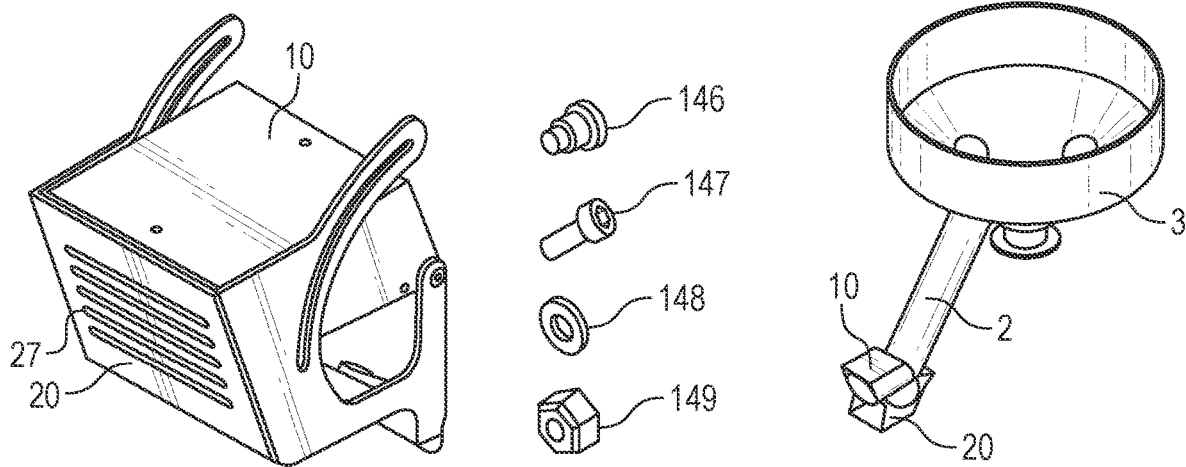
FIG. 4A
FIG. 4B (SIDE VIEW)

(TOP VIEW)

(REAR VIEW)

(REAR PERSPECTIVE VIEW)

(SIDE VIEW)

(FRONT VIEW)

(BOTTOM VIEW)

(PERSPECTIVE VIEW)

(FRONT VIEW)

(SIDE VIEW)

(REAR VIEW)

(BOTTOM VIEW)

(BOTTOM VIEW)

(TOP VIEW)

(SIDE VIEW)

(PERSPECTIVE VIEW)

(TOP VIEW)

(FRONT VIEW)

(PERSPECTIVE VIEW)

(PERSPECTIVE VIEW)

(SIDE VIEW)

(END VIEW)

(FRONT VIEW) (SIDE VIEW) (TOP VIEW)

FIG. 21B  FIG. 21C

PROTEIN FEEDER TIMED-ACCESS CONTROL SYSTEM

CROSS-REFERENCE

This application claims the benefit of U.S. Provisional Application No. 63/535,659, filed Aug. 31, 2023, which application is incorporated herein by reference as if reproduced in full below.

BACKGROUND

The present disclosure is generally directed to deer feeders and more specifically to a protein feeder timed-access control system as an improvement to existing gravity fed protein feeders to increase the opportunities to attract and harvest the target animal at the protein feeder site during legal daylight hunting hours.

SUMMARY

Provided herein is a gravity-fed feeder improvement system comprising of a timed-access control system configured to increase opportunities to attract a target animal for harvesting at a feeder site during specific hours, said timed-access control system comprising: a programmable timer switch, a feed access control door assembly; a linear actuator; actuator alignment bracket and assembly mount.

In some embodiments, the timed-access control system further comprises a primary battery; and an electromagnetic coil relay.

In some embodiments of the timed-access control system said primary battery is rechargeable.

In some embodiments of the timed-access control system, said programable timer switch further comprises a back-up battery, wherein said backup battery is configured to maintain the programmable timer dynamic memory settings in the event power is lost from the primary battery and wherein said back-up battery is rechargeable.

In further embodiments, the timed-access control system further comprises a solar panel, wherein said solar panel is configured to maintain and recharge the primary battery.

In still further embodiments of the timed-access control system, said solar panel is also configured to maintain and recharge the programmable timer backup battery.

In some embodiments, the of the timed-access control system, the programmable timer switch comprises static memory to maintain timer settings so that a backup battery is not needed.

In some embodiments, the timed-access control system further comprises a control box housing, an electrical junction box, and waterproof electric connectors configured to withstand year-round harsh weather conditions.

In some embodiments, said system controls the number of times per day a target animal can access feed attractant inside dispensing tubes of the improved gravity-fed protein feeder.

In some embodiments, said system controls the time of day a target animal can access feed attractant inside dispensing tubes of the improved gravity-fed protein feeder.

In some embodiments, said system controls a window of time a target animal can access feed attractant inside dispensing tubes of the improved gravity-fed protein feeder.

Provided herein is a gravity-fed feeder improvement system comprising a timed-access control system configured to control access to a protein feed attractant through three feed access variables: 1.) the time of the day; 2.) the number of times per day; and critically, 3.) the duration of the time the feed attractant is accessible.

In some embodiments of the gravity-fed feeder improvement system, the timed-access control system comprises: a programmable timer switch, a feed access control door assembly, a linear actuator, an actuator alignment bracket and assembly mount, an electromagnetic coil relay, a rechargeable battery and a solar panel, wherein said solar panel is configured to maintain and recharge the primary battery.

In some embodiments of the gravity-fed feeder improvement system, the timed-access control system comprises a back-up battery wherein said backup battery is configured to maintain dynamic memory settings in the event power is lost from the primary battery, and wherein said backup battery is rechargeable.

In some embodiments of the gravity-fed feeder improvement system, the solar panel is also configured to maintain and recharge the backup battery.

In some embodiments of the gravity-fed feeder improvement system, the system further comprises a control box housing, an electrical junction box and waterproof electric connectors configured to withstand year-round harsh weather conditions.

In some embodiments of the gravity-fed feeder improvement system, the feed access control door further comprises scent openings so that the target animals can more easily smell the feed attractant in the feed tubes when the access doors are closed.

Additional aspects and advantages of the present disclosure will become readily apparent to those skilled in this art from the following drawings and detailed description, wherein only exemplary embodiments of the present disclosure are shown and described, simply by way of illustration of the several modes or best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the system are set forth with particularity in the appended claims. A better understanding of the features and advantages of the present system will be obtained by reference to the following detailed description that sets forth illustrative embodiments in which the principles of the system are utilized, and the accompanying drawings of which:

FIG. 3 is a front view of an illustrative version of several components of the timed-access control system installed on an existing gravity fed protein feeder's feed distribution tube, with the system in the "door closed" position, preventing the target animal from accessing the feed attractant in the distribution tube.

FIG. 4A is an upper perspective view illustrating a detailed version showing the Feed Access Control Door Assembly, of FIG. 3, in the closed position, with a detailed view of several assembly bolts, washer and nut for the hinge.

FIG. 4B is an upper perspective view of a feeder illustrating the Feed Access Control Door Assembly in an open position at the opening of the Gravity Feed Distribution Tube.

FIGS. 21A-21C are various front, side top and perspective views of the three types of crimp style connectors used for removable connections in the electrical circuit of the system.

Figure 1:
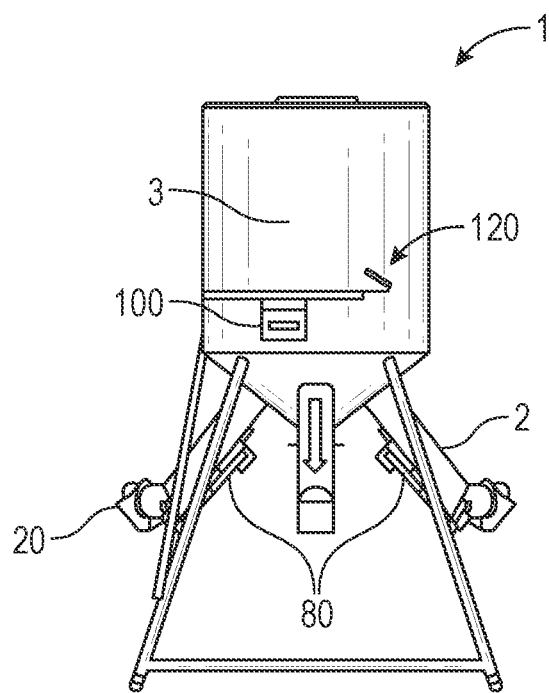
FIG. 1 is a front view showing a common version of a gravity fed protein feeder, retrofitted with the inventive timed-access control system. The view shows the various components of the system and their location on an existing common protein feeder.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Gravity-fed protein pellet deer feeders serve two main purposes: 1.) to provide a high nutritional value food attractant for the target animal, commonly whitetail deer, and 2.) to attract deer to the feeder at times of the day when they can be legally harvested.

In addition to the obvious benefits of providing an attractant source of protein for harvesting deer, a supplemental source of protein is good for the deer population in general. A diet comprising three to five pounds of 16-20% protein pellets is often considered to be an ideal range for whitetail deer monitored in research pens. There has been controversy over the years regarding the percentage of dietary protein required by wild deer. However, research conducted in 1973 in South Texas by the Texas Parks and Wildlife Department has shown that wild deer diets at certain times of the year can be more than 25 percent protein. Many forbs highly utilized by deer are more than 30 percent protein. Obviously, the wild deer are unharmed by consuming these high-protein plants. Indeed, excellent antler growth years were those with superb spring forage conditions. The resulting antler growth from a 16-20% protein suggests that not only were the deer not harmed by their high-protein diet, they actually utilized the protein to grow larger, with greater weight and bigger antlers, indicating that higher protein is necessary for a buck to achieve his genetic potential for weight and antler growth. Whereas deer receiving an 8%-10.5% protein diet in that same year correspondingly responded with inferior weight and antler characteristics, regardless of genetics.

The gravity fed protein feeder accomplishes this by storing and distributing a food attractant that is high in nutritional value, usually in the form of pellets. The feed is commonly distributed by gravity from an elevated hopper into distribution tubes mounted to the funnel-shaped bottom of the hopper. A short horizontal section at the end of the distribution tube causes the feed to accumulate, thereby stopping the flow. When the feed pellets are eaten by the deer, gravity flow automatically replaces the amount eaten from the tube. The horizontal end portion of the tube is positioned at a height where deer can easily consume the protein pellet feed attractant.

Other common feeder styles include hanging feeders, trough feeders and spin or broadcast feeders. Each of these designs essentially provides access to feed 24 hours a day where the deer can come and consume the feed attractant at any time, day or night Gravity fed protein deer feeders are available in two styles. The first is the free feed style, where the feed pellets are accessible in the horizontal end piece of the distribution tubes 24 hours a day, and therefore, deer can consume any or all of the feed attractant at any time of day or night. The second style is a metered style feeder, where only a specified quantity of feed becomes available, at specific times. Once the metered amount of feed attractant is delivered into the distribution tube, deer can still consume the feed attractant at any time of day or night until it is all consumed.

However, neither of the two styles of gravity feeder controls the window of time that the food source is accessible by the deer.

In all the 48 lower United States, legal harvest times for whitetail deer are restricted to daylight hours only, typically from 30 minutes before sunrise, until 30 minutes after sunset. When hunting pressure occurs at the protein feeder site during the daylight hours, whitetail deer quickly adapt to avoid human interaction at or near the site. The target animal adapts by changing their feeding patterns at the feeder site from feeding during the daytime to nocturnal feeding only. The adaptation to feeding only nocturnally at the feeder site is a natural reaction for the target animal, as they experience little, if any, human interaction at night. When deer change to this pattern of solely nocturnal consumption of the protein feed attractant, the gravity fed protein feeder becomes deficient in one of its two main purposes: to attract whitetail deer at times of the day when they can be harvested.

Thus, based on their designs, both the free feed and the metered feed styles of protein feeders have the following major deficiency: the food attractant is available for consumption continuously, or for uncontrolled periods of time, both day and night. The present system improvement cures this deficiency.

A number of individual components of a timed-access control kit can be custom-made, while others may be acquired components that can be uniquely assembled with the custom components of the feed access control door assembly, actuator alignment bracket and assembly mount into a system as described herein and attached to most existing gravity fed protein feeders.

The system controls access to the protein feed attractant through three feed access variables: 1.) time of the day; 2.) the number of times per day; and critically, 3.) the duration of the time the feed attractant is accessible.

The system allows the hunter to control all 3 variables, which in the proper combination, forces the target animal to access the feed attractant pellets only during daylight hours, when harvesting is legal.

The present device will now be described more fully hereinafter with reference to the accompanying drawings which illustrate embodiments of the gravity fed protein feeder with the timed-access control system.

This gravity fed protein feeder with the timed-access control system may, however, be embodied in many different forms and should not be construed as limited to the illustrated embodiments set forth herein Rather, these embodiments are provided so that this disclosure will be thorough and complete, and will fully convey the scope of the device to those skilled in the art.

The following description of the exemplary embodiments refers to the accompanying drawings. The following detailed description does not limit the system/apparatus. Instead, the scope of the system/apparatus is defined by the appended claims.

Reference throughout the disclosure to "an exemplary embodiment," "an embodiment," or variations thereof and like phrases means that a particular feature, structure, or characteristic described in connection with an embodiment is included in at least one embodiment of the subject matter disclosed. Thus, the appearance of the phrases "in an exemplary embodiment," "in an embodiment," or variations and like phrases thereof in various places throughout the disclosure is not necessarily referring to die same embodiment. Further, the particular features, structures or characteristics may be combined in any suitable manner in one or more embodiments.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 5.0 kg, 2.5 kg, 1.0 kg, 0.9 kg, 0.8 kg, 0.7 kg, 0.6 kg, 0.5 kg, 0.4 kg, 0.3 kg, 0.2 kg or 0.1 kg of a given value or range, including increments therein. In certain embodiments, the term "about" or "approximately" means within 1 hour, within 45 minutes, within 30 minutes, within 25 minutes, within 20 minutes, within 15 minutes, within 10 minutes, within 5 minutes, within 4 minutes, within 3 minutes within 2 minutes, or within 1 minute. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range, including increments therein.

As used herein, and unless otherwise specified, the term "plurality", and like terms, refers to a number (of things) comprising at least one (thing), or greater than one (thing), as in "two or more" (things), "three or more" (things), "four or more" (things), etc.

As used herein, the terms "connected", "operationally connected", "coupled", "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, the terms "user", "subject" or "patient" are used interchangeably. As used herein, the terms "subject" and "subjects" refers to an animal (e.g., birds, reptiles, and mammals and a non-primate (e.g., deer, elk, camel, donkey, zebra, cow, pig, horse, cat, dog, rat, and mouse). In certain embodiments, the mammal is 0 to 6 months old, 6 to 12 months old, 1 to 5 years old, 5 to 10 years old, 10 to 15 years old, 15 to 20 years old. (In a preferred embodiment, the subject or patient is a deer. In certain embodiments, the deer is 0 to 6 months old, 6 to 12 months old, 1 to 5 years old, 5 to 10 years old or 10 to 15 years old. The natural lifespan of a whitetail deer is 2.5-18 years. It is worth noting the average lifespan of a wild whitetail deer is 4.5 years. However, the lifespan can vary depending on factors such as location, sex, and food availability. For instance, the average life expectancy of a whitetail wild buck is 2.9 years, while the average lifespan of a wild whitetail doe is 6.5 years. It's worth noting that captive whitetail deer can live much longer than wild whitetail deer. A well-fed captive whitetail deer can be expected to live up to 18 years. It has also been noted that whitetail deer in the North-West US survive somewhat longer, on average, because they have access to more food, and they are in a somewhat less stressful environment.

As used herein, and unless otherwise specified, the term "anterior" refers to anatomy and means the front surface of the body; often used to indicate the position of one structure relative to another, that is, situated nearer the front part of the body. Alternately, it may also refer in a similar fashion to an apparatus or structure.

As used herein, and unless otherwise specified, the term "posterior" refers to anatomy and means the back surface of the body; Often used to indicate the position of one structure relative to another, that is, nearer the back of the body. Alternately, it may also refer in a similar fashion to an apparatus or structure.

As used herein, and unless otherwise specified, the term "superior" refers to anatomy and means situated nearer the vertex of the head in relation to a specific reference point; opposite of inferior. It may also mean situated above or directed upward. Alternately, it may also refer in a similar fashion to an apparatus or structure.

As used herein, and unless otherwise specified, the term "inferior" refers to anatomy and means situated nearer the soles of the feet in relation to a specific reference point; opposite of superior. It may also mean situated below or directed downward. Alternately, it may also refer in a similar fashion to an apparatus or structure.

As used herein, and unless otherwise specified, the term "medial" refers to anatomy and means situated toward the median plane or midline of the body. Alternately, it may also refer in a similar fashion to an apparatus or structure.

As used herein, and unless otherwise specified, the term "lateral" refers to anatomy and means denoting a position farther from the median plane or midline of the body or a structure. It may also mean "pertaining to a side". Alternately, it may also refer in a similar fashion to an apparatus or structure.

As used herein, the term "proximity" means nearness in space or relationship, but not excluding the potential to be touching. Proximity is also alternatively meant to mean that one thing may be so close to another thing as to be "in direct or nearly direct contact" (in proximity) with another thing along some point. To "place something in proximity" is also meant to mean that items are "paired" or "mated together" either in their paired function or at some point of contact.

As used herein, and unless otherwise specified, the term "translucent" means allowing some, but not all, light to pass through a thing Being of a nature that allows for the partial transmission of light but causing sufficient diffusion to prevent perception of distinct images therethrough. Alternatively, translucent may also mean allowing light to pass through only partially or diffusely; being semi-transparent. In some embodiments, it may be advantageous to modify the meaning of transparent wherein an alternative meaning may include translucent or shaded to mean that the clarity remains only slightly altered or dulled, but the "brightness", "tone", "luminance", "luminosity", and or "lightness" may be altered, allowing filtered light to pass through such as for example may occur with windows, sunglasses, one-way mirrored coatings, clear, tinted or colored lenses.

As used herein, and unless otherwise specified, the term "vertically oriented" and similar terms mean; generally perpendicular to, at, or near, right angles to a horizontal plane; in a direction or having an alignment such that the top of a thing is above the bottom. In certain embodiments, the term "vertically oriented" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, the term "horizontally oriented" and similar terms mean; generally perpendicular to, at, or near, right angles to a vertical plane; in a direction or having an alignment such that the top of a thing is generally on, or near the same plane as the bottom, both being parallel or near parallel to the horizon. In certain embodiments, the term "horizontally oriented" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, the term "substantially perpendicular" and similar terms mean generally at or near 90 degrees to a given line, or surface or to the ground. In certain embodiments, the term "substantially perpendicular" means within ±20.0 degrees, ±15.0 degrees, ±10.0 degrees, ±9.0 degrees, ±8.0 degrees, ±7.0 degrees, ±6.0 degrees, ±5.0 degrees, ±4.0 degrees, ±3.0 degrees, ±2.0 degrees, ±1.0 degrees, ±0.9 degrees, ±0.8 degrees, ±0.7 degrees, ±0.6 degrees, ±0.5 degrees, ±0.4 degrees, ±0.3 degrees, ±0.2 degrees or ±0.1 degrees of a given value or range, including increments therein.

As used herein, and unless otherwise specified, combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

Described herein is a gravity-fed protein feeder improvement comprising a timed-access control system configured to increase opportunities to harvest a target animal at a protein feeder site during daylight hours, said timed-access control system comprising a programable timer switch, a battery, a solar panel, a feed access control door assembly, an electromagnetic coil relay, a linear actuator, actuator alignment bracket and assembly mount.

Turning now descriptively to the drawings, in which similar reference characters denote similar elements throughout the several views, the figures illustrate an example embodiment comprising 1.) a Feed Access Control Door Mounting Bracket; 2.) a Feed Access Control Door; 3.) a Programmable Electronic Timer Switch; 4.) an Electrical Junction Box; 5.) a 2-Wire Cable, 14 AWG; 6.) a 12-Volt Battery; 7.) an Electromagnetic Coil Relay; 8.) a Linear Actuator; 9.) an Actuator Alignment Bracket and Assembly; 10.) a Control Box Housing; 11.) Hose Clamps; 12.) a Solar Panel; 13.) and Waterproof Electrical Connectors.

Referring now to FIG. 1, a modified gravity fed deer protein feeder is illustrated with a number of improvements added to create a modified access for the distribution tubes needed to overcome the primary shortcomings of all common gravity fed deer protein feeders; freestyle feeding and metered style feeding, with no control over time of day or duration of time when feed attractant is made available.

Specifically, as shown in FIG. 1, the modified gravity fed deer protein feeder 1, comprises a timed-access control system configured to increase opportunities to harvest a target animal at a protein feeder site during daylight hours, said timed-access control system comprises a closable feed access control door sub-assembly comprising a feed access control door upper mounting bracket (door saddle) 10 and the feed access control door 20 mounted on or about the end of each of the available gravity feed distribution tubes. Further, a Linear Actuator 80 for opening and closing the closable access control door sub-assembly is illustrated beneath the each of the gravity feed distribution tubes, held in place by the Actuator Alignment Bracket 90. Also shown herein is the Solar Charging Panel 120 for charging the batteries and a Control Box 100, for housing the battery 60, timer control 30 and multiple electrical components.

Figure 2:
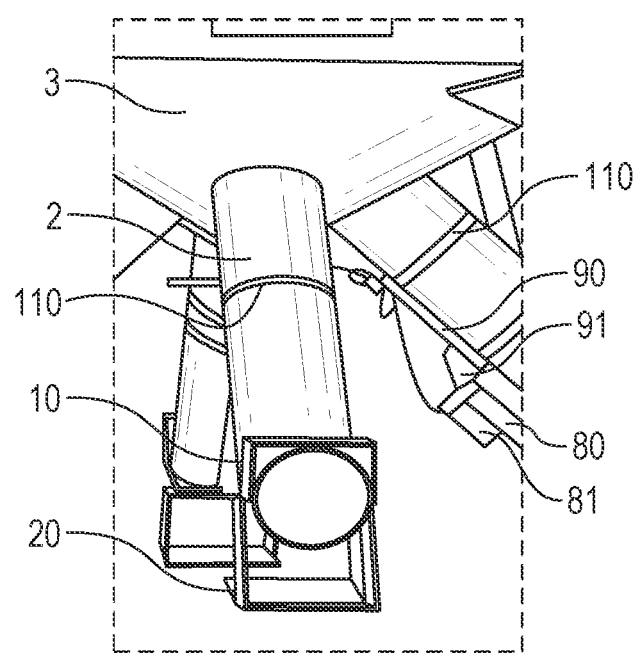
FIG. 2 is a front view of an illustrative version of several components of the timed-access control system installed on an existing gravity fed protein feeder's feed distribution tube, with the system in the "door open" position, allowing the target animal to access to the feed attractant in the distribution tube.
Figure 5A:
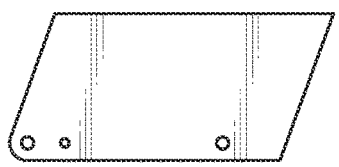
FIGS. 5A-5D are side, top, rear and rear perspective views showing illustrative detailed mechanical drawings of the Feed Access Control Door Mount describing at least one possible design and construction.
Figure 5B:
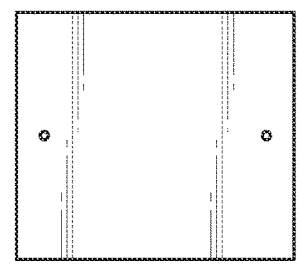
Figure 5C:
Figure 5D:
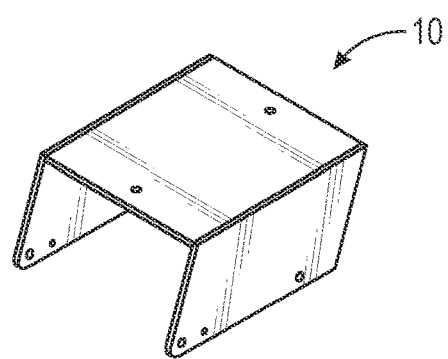

Further, as shown in FIGS. 2 and 3, is a front view of one of the characteristic gravity fed distribution tubes illustrating the improved timed-access closable feed access control door sub-assembly 10, 20 in both the open and closed position. Also shown in an adjacent side view of a gravity feed distribution tube are the actuator alignment bracket 90 and actuator base mounting bracket 91. Mounting hose clamps 110 for securing the actuator base mounting bracket 91 are also visible. FIG. 3 also illustrates feed scent openings 27 in the feed access control doors to assure that the target animals can easily smell the scent of the protein feed attractant when the access door is closed, and natural breezes can waft through the door to pick up and carry the scent outward.

As shown in FIGS. 4A & B, are detailed views of an illustrative access control door assembly comprising the feed access control door upper mounting bracket (door saddle) 10 and the feed access control door 20. As shown, are representative mounting holes and various assembly components used to affix the illustrative access control door assembly to the mounting bracket at the hinges of the control door and to an existing gravity fed distribution tube comprising shoulder bolts 26, button head bolts 27, washers 28, and fiber lock nuts 29.

FIGS. 5A-5D merely illustrate various views of the mechanical drawings utilized to fabricate the feed access control door upper mounting bracket (door saddle) 10 as shown in FIG. 4A.

Figure 6:
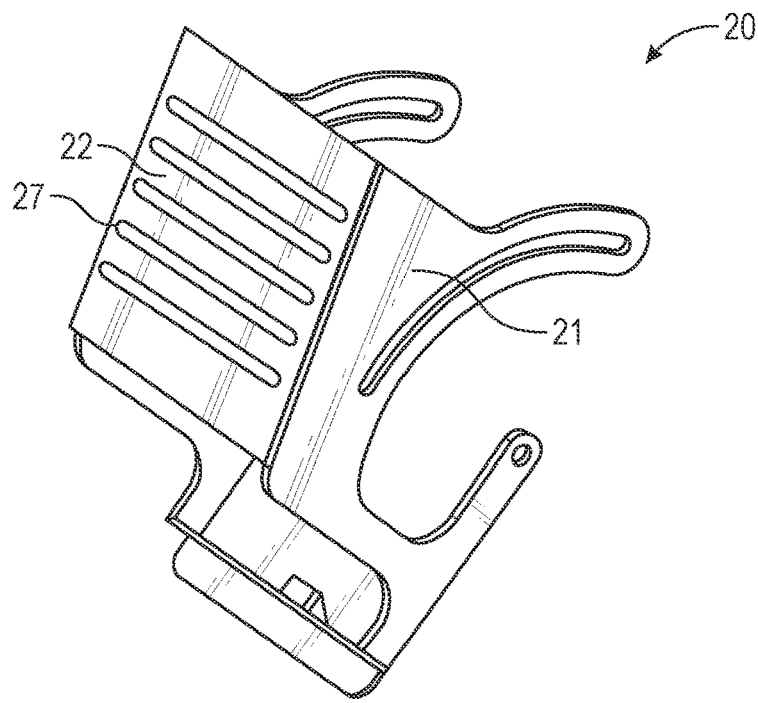
FIG. 6 is an upper perspective view showing an illustrative drawing of the unassembled Feed Access Control Door with scent slots in the door plate.

FIG. 6 is an upper front perspective view and detailed example of the feed access control door 20 in isolation with the front door plate 22, the scent openings 27 and door hinge side plate 21.

Figure 7:
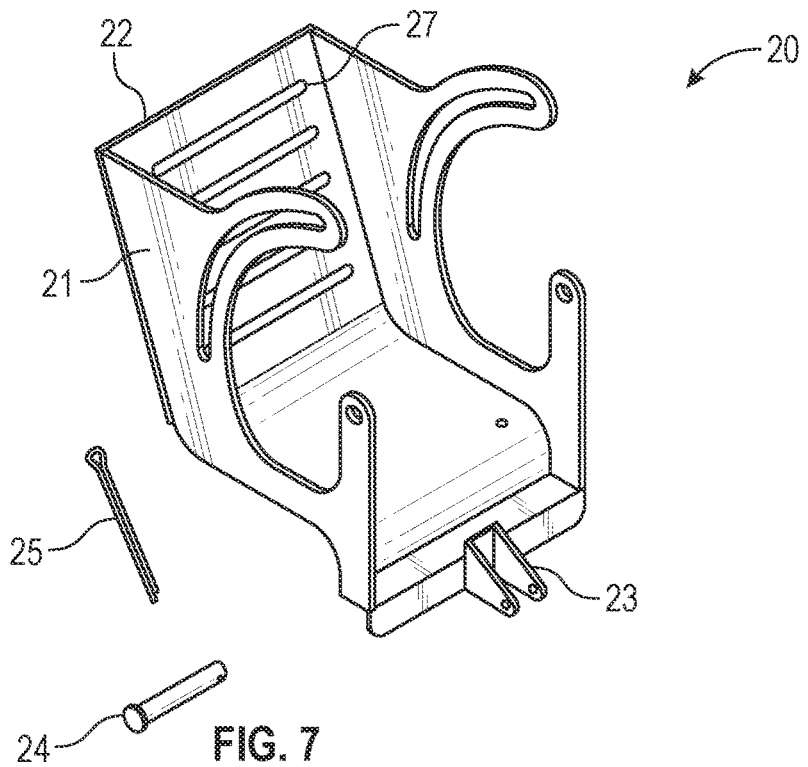
FIG. 7 is a rear perspective view showing a detailed view of the unassembled Feed Access Control Door showing the door plate, door hinge side plate, actuator mounting shaft bracket, actuator shaft connecting pin and cotter key.
Figure 8A:
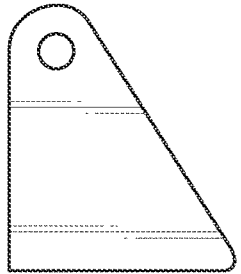
FIGS. 8A-8D are side, front, bottom and upper perspective views showing illustrative detailed mechanical drawings of the actuator shaft mounting bracket.
Figure 8B:
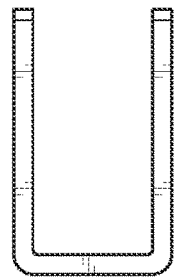
Figure 8C:
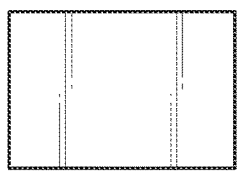
Figure 8D:
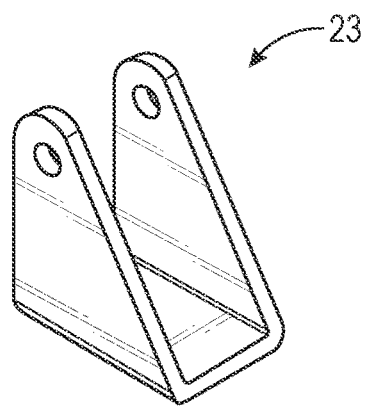
Figure 9A:
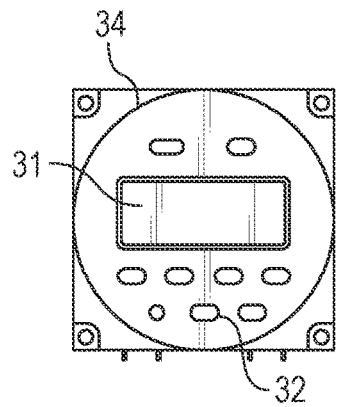
FIGS. 9A-9D are front, side, rear and bottom detail views of the programmable timer switch, another primary component of the Timed-Access Control System. The drawings show the physical features of the timer including the LCD display, control buttons and the electrical connection points of the timer.
Figure 9B:
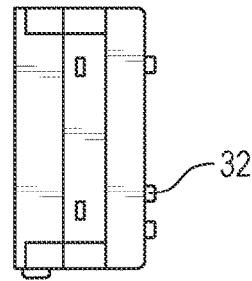
Figure 9C:
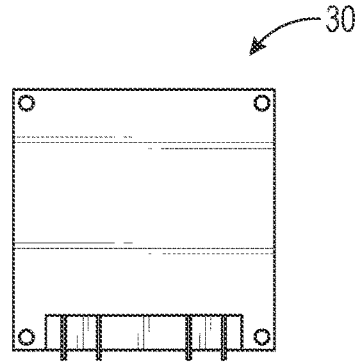
Figure 9D:
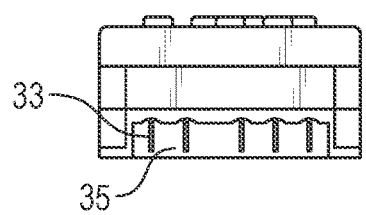

FIG. 7 is an upper rear perspective detailed view of the feed access control door 20 and its sub-assembly components, in an isolated state, comprising: the (2) door hinge side plates 21, the door plate 22 with the scent openings 27, the actuator shaft mounting bracket 23, the actuator shaft connecting pin 24 and the connecting pin cotter key 25.

FIGS. 8A-8D illustrate several mechanical detailed views of the actuator shaft mounting bracket 23, shown and described above in FIG. 7.

FIG. 9 illustrates a third primary component of the protein feeder timed access control system; the programmable timer switch 30. As illustrated, the system programmable timer switch comprises an ABS plastic case 34 for protection from the outdoor elements, an LCD display 31, miscellaneous programming control button features 32, along with positive and negative terminal post power connections 33, 35.

In some embodiments of the timed-access control system said programable timer switch 30 further comprises a backup battery (not shown) contained inside the ABS plastic case, wherein said backup battery is configured to maintain dynamic memory settings of the timer control switch 30 in the event power is lost from the primary battery. In order to avoid this potential problem however, in some embodiments, the of the timed-access control system, the programmable timer switch comprises static memory to maintain timer settings so that a backup battery is not needed.

Figure 10:
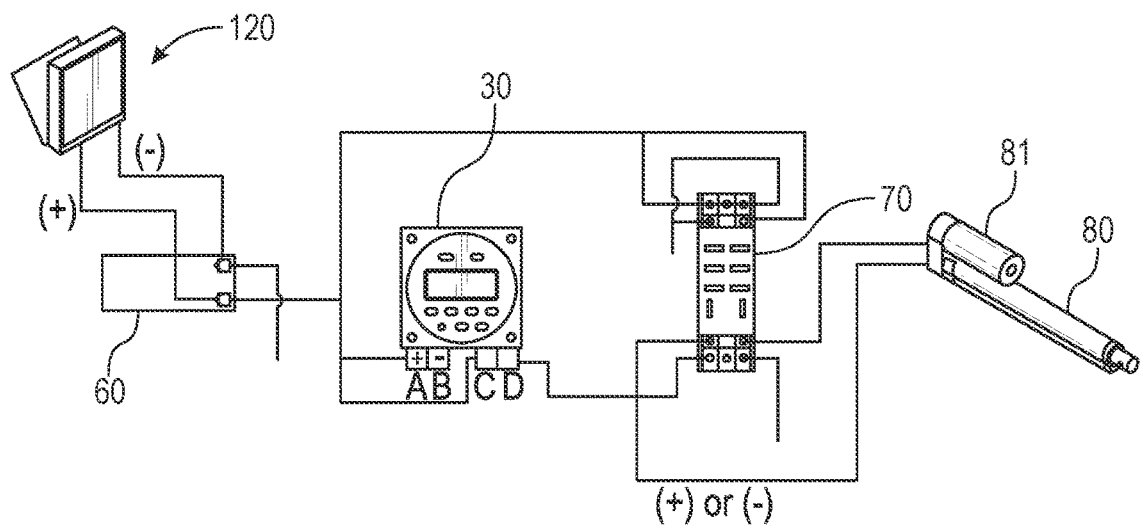
FIG. 10 is a simple schematic view of the Wiring Diagram Schematic of the invention and the wiring connections to the electrical components of the invention comprising the solar charging panel, the rechargeable battery, the programmable timer, the electronic coil relay, linear actuator and linear actuator motor.
Figure 11A:
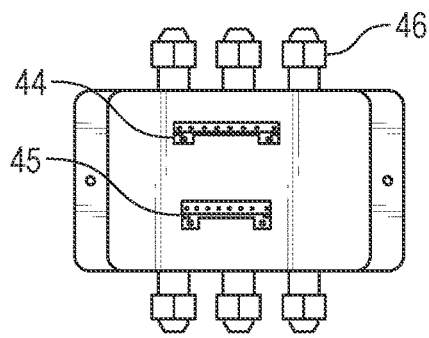
FIGS. 11A-11D are detailed bottom, top, side and perspective views of the Electrical Junction Box.
Figure 11B:
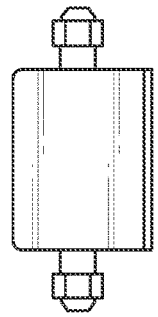
Figure 11C:
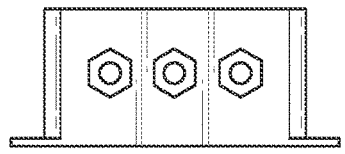
Figure 11D:
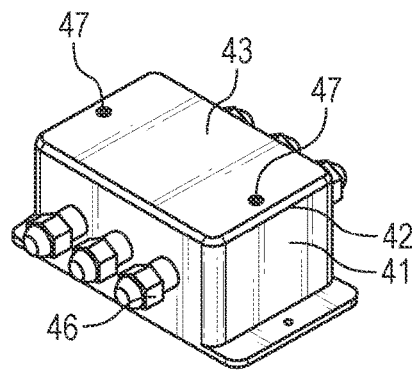

Also illustrated herein is a typical wiring diagram for the protein feeder timed-access control system, as shown in FIG. 10. As illustrated, the programmable timer switch 30 receives power from an AGM (Absorbent Glass Mat) rechargeable 12V battery 60, which in turn receives maintenance recharging from a solar panel 120 configured to deliver a 12V trickle charge. The programmable timer switch 30 is then configured to periodically activate a 12V DPDT (Double Pole Double Throw) electromagnetic coil relay 70 which then actuates the linear actuator 80 to either open or close the feed access control door 20.

As further illustrated, all of the electrical connections are comprised of heavy duty, all-weather components configured to withstand nature's elements. As shown in FIGS. 11A-11D through 12A-12C, the electric components of the system comprise an enclosable electrical junction box 40, with an ABS plastic body 41 and lid 43, rubber sealing gaskets 42, mounting screws 47 and configured with waterproof rated in/out cable interfaces 46, and 12V+/− Bus bar terminal strips 44, 45. The structure of the Electrical Junction Box is an ABS plastic base, with a rubber or comparable lid gasket 42 where the body 41 and a removeable lid 43 join to serve as a watertight seal. The removable lid is held in place by two screws 47. Mounted inside the Electrical Junction Box are terminal connection strips, one for positive connections and one negative connection that commonly use #8 size screws to accept wire terminal ring connectors. The box is IP 67 waterproof rated (meaning it can withstand immersion in water up to 1 meter for 30 minutes) and has 6 each size M16 cable interface connections.

The function of the Electrical Junction Box is to serve as the communal meeting spot for 2-Wire Cable, 14 AWG (American Wire Gauge) carrying the incoming current, either positive or negative, from the Electromagnetic Coil Relay 70 to the Linear Actuators 80. The positive and a negative terminal connection strip mounted inside the box allows the Linear Actuators to be connected in parallel. The Electrical Junction Box 40 serves to receive the electrical signal from the electromagnetic coil relay 70 through the incoming 2-Wire Cable, 14 AWG and distributes the electrical signal to the Linear Actuators through the outgoing 2-Wire Cable, 14 AWG.

Figure 12A:
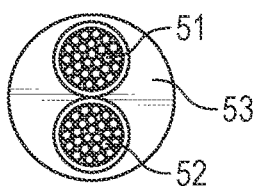
FIGS. 12A-12C are detailed end, side and perspective views of the 2-Wire Cable, 14 AWG used to carry current to the electrical components of the system.
Figure 12B:
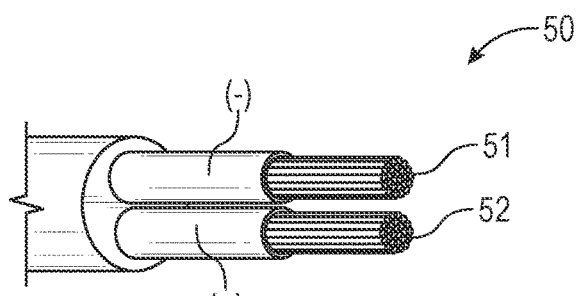
Figure 12C:
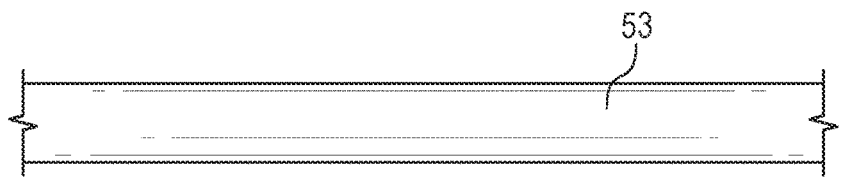

As shown in FIGS. 12A-12C, the structure of the 2-Wire Cable, 14 AWG consists of two 14 AWG stranded copper conductor wires, 1 red, 1 black, formed into a 2-Wire Cable by a PVC jacket that houses both wires. The PVC cable housing is chemical resistant and resistant to UV degradation from sunlight. The rated operating temperature is −35 to +176 degrees Fahrenheit. The maximum working voltage is 300 volts. The 2-Wire Cable, 14 AWG is UL listed, RoHS compliant and has a fireproof rating of VW-1. The function of the 2-Wire Cable, 14 AWG, is to distribute electrical current to the electrical components of the system. Possible structural and functional variations of the wire cable, 14 gauge include 12 AWG or 16 AWG wire.

Figure 13A:
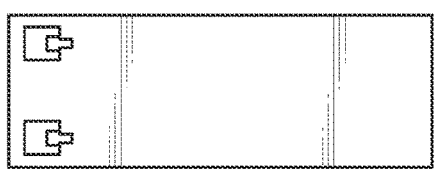
FIG. 13A-13C are top, front and upper perspective views illustrating the 12-volt AGM sealed battery used as rechargeable power source for the operation of the electrical components of the invention.
Figure 13B:
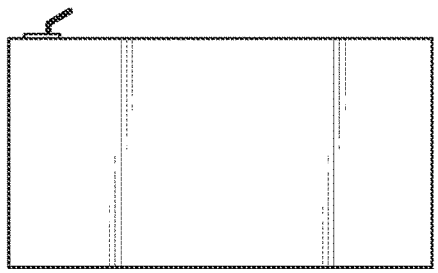
Figure 13C:
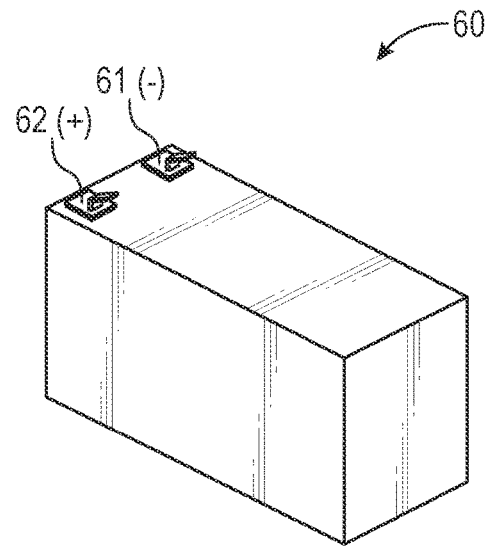

Further, the primary battery 60, as illustrated in FIGS. 13A-13C, is configured as a 12V DC rechargeable AGM sealed power supply capable of delivering at least 7.8 Amp hours. It is configured with a thermoformed plastic case containing absorbent glass mat between lead plates immersed in electrolyte solution. The solution is made of sulfuric acid and water. The case has two male spade terminals, one positive and one negative. The function of the 12-Volt Battery is to provide the power source to operate the electrical components of the invention. The interconnections of the 12-Volt Battery are to connect to the 12-Volt Solar Panel to maintain its charge and to connect to the Programmable Electronic Timer Switch to energize the electrical system. The AGM (Absorbent Glass Mat) rechargeable 12V battery comprises a fiberglass mat that sits between the positive and negative lead plates of the battery. The fiberglass absorbs the and holds the battery acid such that it doesn't flow freely around the battery. Possible variations include lead acid and lithium ion batteries.

Figure 14A:
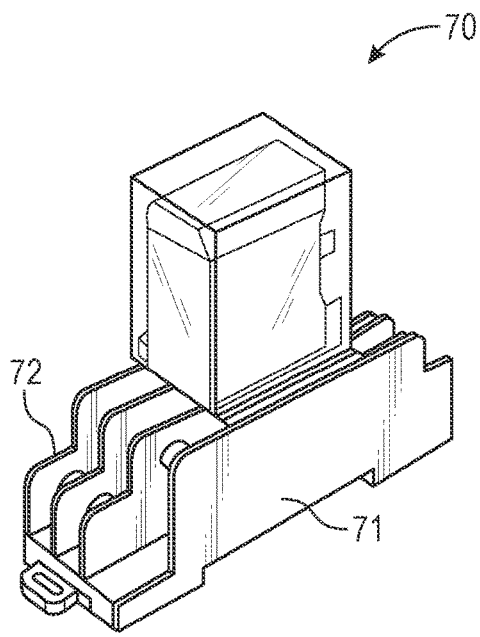
FIGS. 14A-14B are illustrations of the Electromagnetic Coil Relay, DPDT with the ABS socket base and a schematic of the electrical current flow as the relay alternates the output current from DC negative to DC positive with each 12-volt DC negative signal received from the programmable timer switch.
Figure 14B:
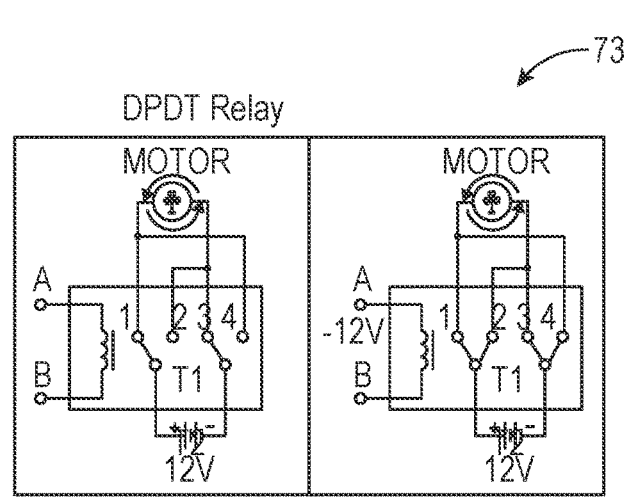

A further primary component of the timed access control system is the electromagnetic coil relay 70, as shown in FIGS. 14A & 14B. The structure of the Electromagnetic Coil Relay 70 comprises 12 Volt, DPDT, an 8-pin, 12V DC DPDT Electromagnetic Coil Relay, 2NO, 2NC with indicator light, mounted to an ABS plastic socket base that has eight screw terminal connection points. The coil relay is rated at 10 A. The function of the Electromagnetic Coil Relay is to reverse the polarity of its output each time it is energized. When energized with 12-volt DC negative input initially, the output is 12-volt DC negative until the relay is de-energized. When the input circuit is subsequently re-energized with 2 v DC negative energy, the relay reverses the output polarity to 12-volts DC positive until de-energized. Each subsequent energizing of the circuit causes the output polarity to reverse from its previous state. Interconnections of the Electromagnetic Coil Relay, 12-Volt, DPDT relay are the input connection from the timer which energizes the relay through the connection of the 2-wire cable, 14 AWG. The output of the relay is carried to the Electrical Junction Box through continuance of the 2-wire cable, 14 AWG. The specifications for the illustrative Electromagnetic Coil Relay comprise: Electromagnetic Power Relay, 8-Pin, 10-AMP 12V DC Relay Coil with Socket Base, an LED Indicator, DPDT 2NO 2NC; Coil Voltage: DC 12V; Contact Capacity: 10 A; Type: DPDT (2NO 2NC); Pins: 8-Pin. The relay's coil is an electromagnet that generates a magnetic field when a current flows through it. This magnetic field then attracts the relay's armature, which is connected to the relay's contacts, causing them to switch positions. Possible variations include a printed circuit board.

Figure 15:
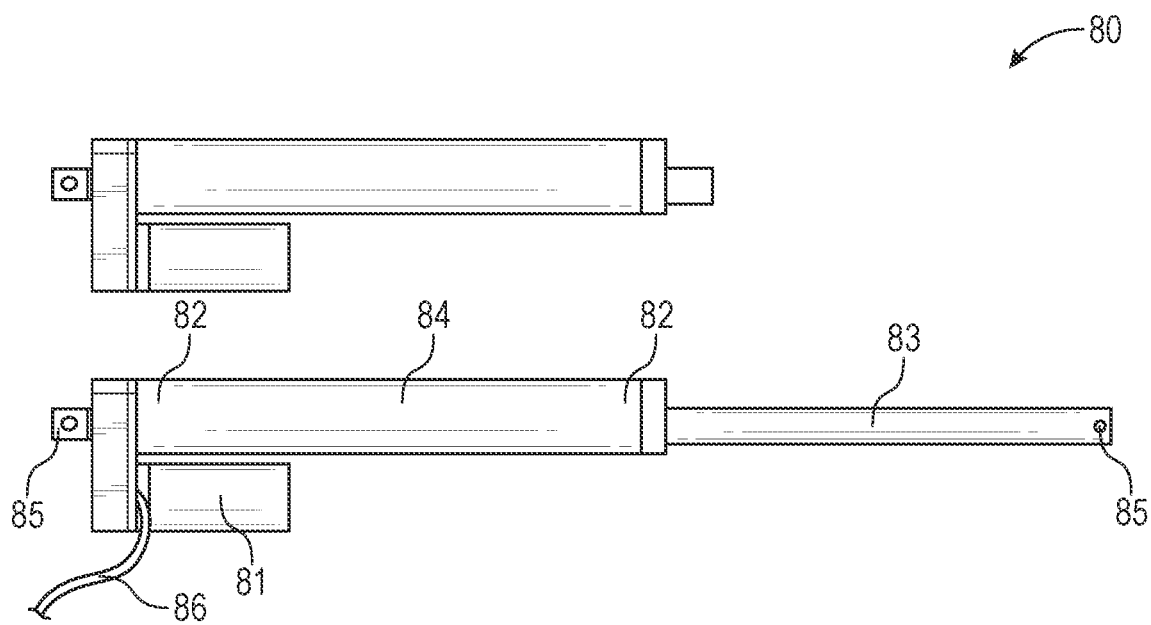
FIG. 15 is a side view illustration of the components of the 12-volt, 8" stroke, Linear Actuator in a retracted and extended position that moves the door from open to close position and vice versa.
Figure 16A:
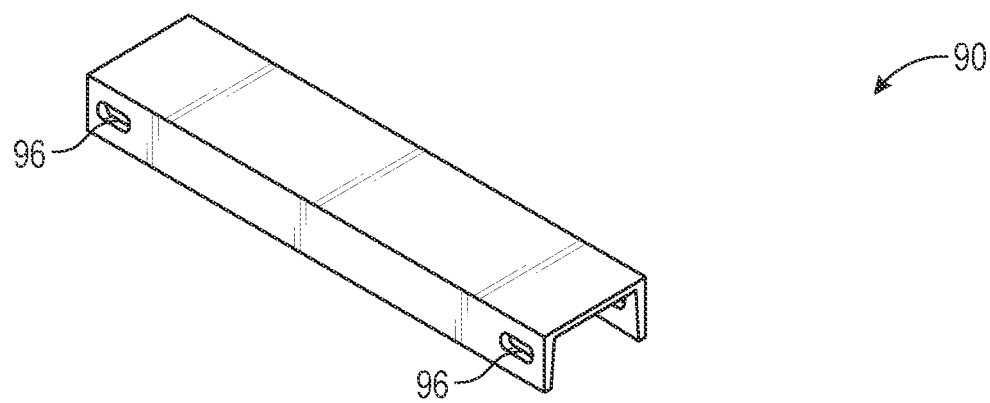
FIGS. 16A-16C are perspective, side and end views of the Actuator Alignment Bracket used to align and properly position the actuator on the feed distribution tube.
Figure 16B:
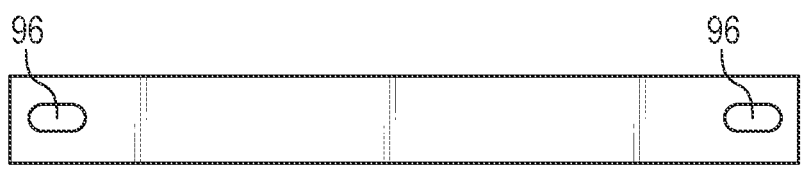
Figure 16C:
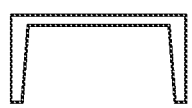

As shown in FIG. 15, another primary component of the Feeder timed-access control system is the 12V DC linear actuator 80. The linear actuator 80 comprises a 12V DC motor 81, an actuator shaft housing 84, the actuator shaft 83, internal actuator shaft limit switches 82, mounting bracket connections 85 (holes or brackets) and wire leads 86 from the motor. The structure of the illustrative Linear Actuator 12-Volt is a 12-volt DC motor driven Linear Actuator with a shaft that extends and retracts approximately eight inches. The actuator has an aluminum housing that protects the motor, gear box and provides a mounting point at each end for the actuator.

The function of the Linear Actuator 80 is to open and close the Feed Access Control Door 20. The Linear Actuator is connected both electrically and mechanically. The electrical connection is from Electrical Junction Box 40 to the Linear Actuator via the 2-wire cable, 14 AWG, 50. The mechanical connection is from the Actuator Base Mounting bracket 91 to the Actuator Shaft Mounting Bracket 23 on the Feed Access Control Door.

Specifications of the illustrative linear actuator comprise:
330 lbs. Linear Actuator Multi-function (12V, 8");
Retracted Length—320 mm, Extended Length 520 mm;
Input Voltage 12V DC;
Max Push Load 1500N/330 lbs Max load 150 KG/330 lbs.;
Max Pull Load 1000N/264 lbs.;
Travel Speed 0.39 in/sec (10 mm/s);
Duty Cycle 25%;
Material: Aluminum alloy;
Operation temperature −26° C. to approximately +65° C.;
Protection Class IP54;
No-load current 0.8 A Max load current 3 A, 12-volt DC;
8 inch stroke, gear driven linear; and
Noise Level: <50 dB.

Possible structural and functional variations include 24-, 36- and 48-volt Linear Actuators, and various stroke length actuators.

In order to properly mount the linear actuator to the protein feeder distribution tubes, an actuator alignment bracket 90 is configured and illustrated in FIGS. 16A-16C and 17.

Further, as shown in FIGS. 16A-16C and 17, the actuator alignment bracket 90, is configured to become an actuator assembly mount designed to hold the electrical junction box 40, an actuator base mounting bracket 91, an actuator shaft connecting pin 92, a connecting pin cotter key 93 and provide securing slots for hose clamps 110 (or similar means of securement) for attaching the entire assembled actuator assembly mount to each of the gravity fed distribution tubes.

The structure of the illustrative Actuator Alignment Bracket 90 is ¼" thickness, 3" wide "C" channel mild or stainless steel with two slots milled into each side leg of the channel for the stainless steel Hose Clamps 110 to pass through.

Figure 17:
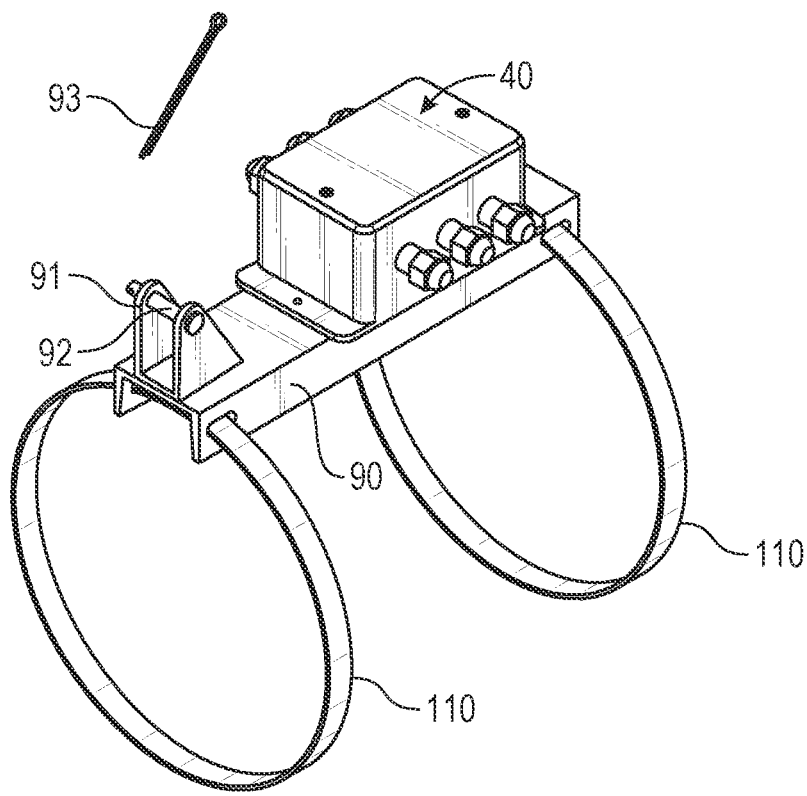
FIG. 17 is a perspective illustration of the Actuator Alignment Bracket Assembly with Electrical Junction Box, Actuator Base Mounting Bracket and Hose Clamps mounted to it. The stainless steel Hose Clamps are utilized to hold the assembly in a static position on the feed distribution tube.

As illustrated in FIG. 17, the function of the Actuator Alignment Bracket 90 is to serve as a mount for the Linear Actuator 80 and to hold the Linear Actuator in place for proper alignment on the underside of the feed distribution tube 2 to effectively actuate (open and close) the Feed Access Control Door 20. A portion of one of the Actuator Alignment Bracket, also functions as a surface to mount the single Electrical Junction Box 40 needed for the invention. The Actuator Alignment Bracket also has the Base Mounting bracket 91 for the actuator attached to it by a weld.

The Linear Actuator 80 mounts to the Actuator Alignment Bracket and becomes an assembly that mounts to the underside of the feed distribution tube. The assembly is held in place with the 8" stainless steel Hose Clamps 110.

Possible variations include various lengths and widths of Hose Clamps to accommodate feed distribution tubes of various brands of protein feeders.

The illustrative Hose Clamps 110 are made of 304 Stainless Steel. The size adjustment mechanism is worm gear driven by a ⁵⁄₁₆ cap screw with a slotted head. The Hose Clamps are adjustable, 8" in diameter when in the fully open position, and 5" in diameter in the fully closed position. They serve to surround the feeding tube, pass through slots in the alignment bracket to hold the actuator in place by pressure when tightened. The Hose Clamps hold the Linear Actuator and Actuator Alignment Bracket in static position by applying pressure around the feed distribution tube when tightened. Possible structural and functional variations include various circumference sizes to fit feed distribution tubes of various manufacturers.

Figure 18:
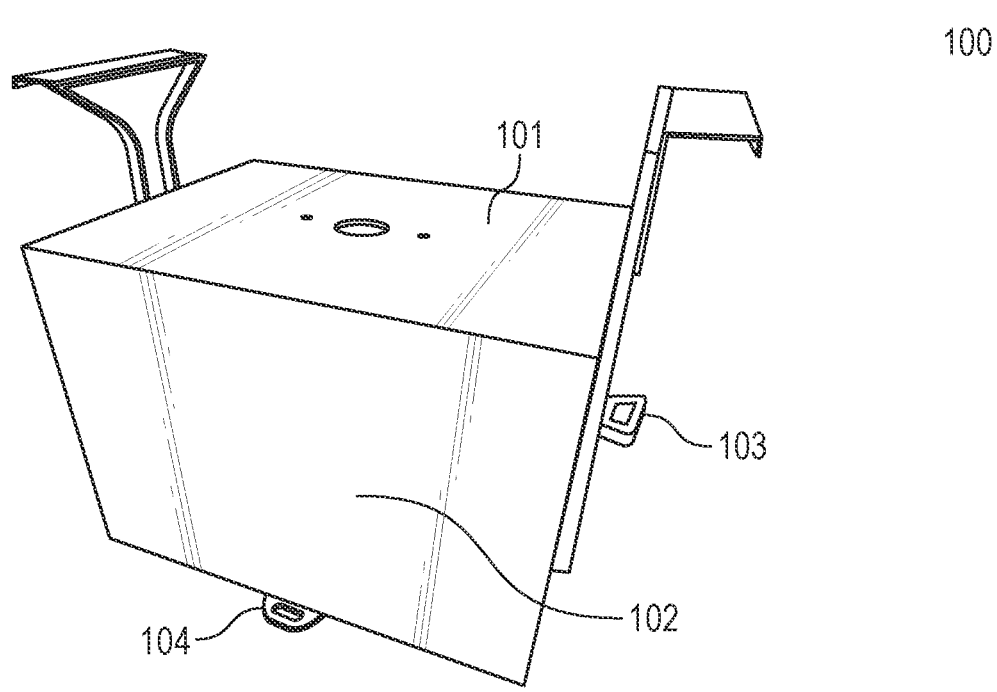
FIG. 18 is a front perspective view of the Control Box Housing which holds the battery, timer, and electromagnetic relay. It is also where the Solar Panel cable connects to the battery.

A portion of the control elements for the Timed-Access Control System are maintained and mounted within a (weatherized) Control Box housing 100, as illustrated in FIG. 18, typically comprising 14-gage galvanized steel 101, optionally comprising a hinged access door 102, an optional 104 and adjustable height slotted mounting brackets 103. Placement of the control box is thus flexible and allows for variability in terrain and elevation as dictated by the user. In the example shown, the control box is typically mounted on the side of the storage hopper 3 of the protein feeder 1.

Commonly, the control box 100 is intended to house the 12-volt battery 60, Electromagnetic Coil Relay 70 and the Programmable Electronic Timer Switch 30.

The illustrative Control Box Housing 100 shown in FIG. 18 is constructed of galvanized 12-gauge sheet metal 101 to form the control box. It has a hinged front access door 102 with bottom latch 104 to prevent the door from opening accidentally once it is closed. The door latch can be slid to the left to allow the door to be opened. When the door is in the closed position, the latch can be slid to the right, home position, to prevent it from opening. The latch 104 protrudes from the body of the metal box having a hole through it towards the exterior end of it, making it lockable with a padlock. It has an adjustable height slotted mounting bracket on two opposing sides.

Figure 19:
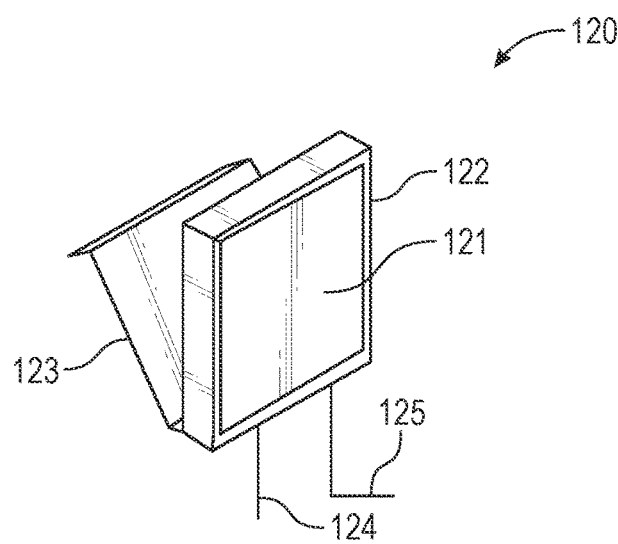
FIG. 19 is a front perspective view of the 12-volt Solar Panel assembly utilized to maintain the charge of the primary and a back-up battery, if utilized.

FIG. 19 illustrates the 12-Volt Solar Panel 120, by which the battery 60 maintains its charge. Energy is gathered from sunlight by the amorphous silicon cells 121, that are covered by the polycarbonate face 126, mounted in an aluminum frame 122. A mounting bracket 123, is part of the frame. The Solar Panel 120 has a positive wire lead 124, and a negative wire lead 125, that connect to the 12-volt AGM Sealed Battery 60 using female spade terminal 14-16 AWG 55 connected to a piggyback double spade terminal 54 on each battery male spade connector post.

Figure 20:
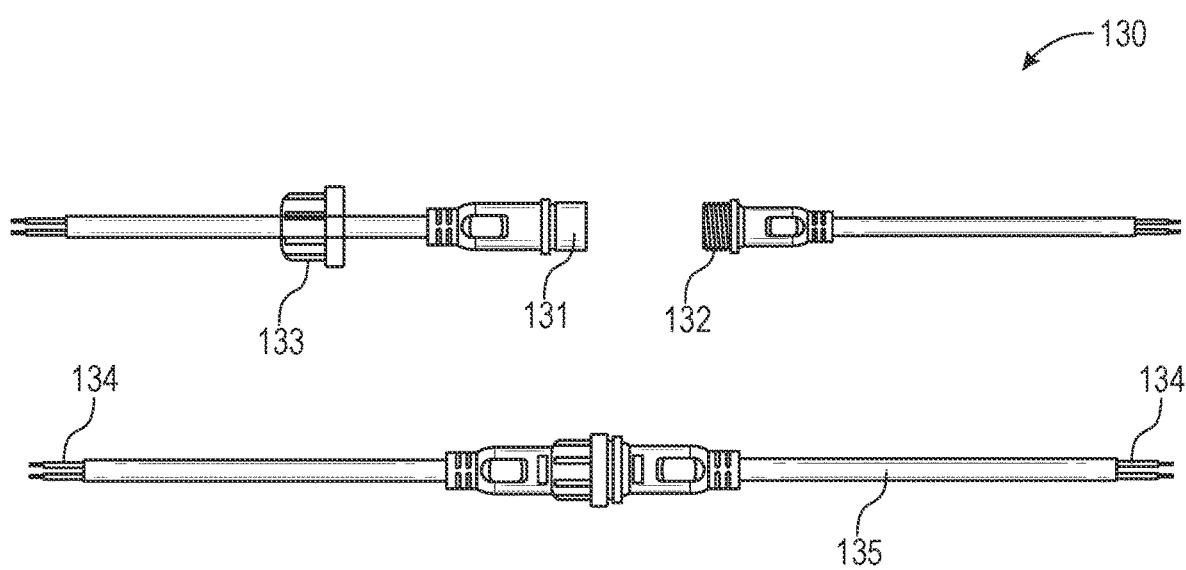
FIG. 20 is a front view of the unassembled and assembled Waterproof Electrical Connectors, 2-pin male and 2-pin female receptacles with threaded connector nut and pigtails used to make the electrical components of the system easily separable.

As shown in FIG. 20, another critical component of the system comprises the use of waterproof electrical connectors 130. The structure of the illustrative Waterproof Electrical Connectors are 2-Wire, 14 AWG Male/Female 2-pin waterproof plug connectors 131, 132 with threaded nut 133 on male side and threaded base on female side that have an IP rating of 68. Their function is to provide a separable electrical connection between the Electrical Junction Box 40 and the Linear Actuators 80 and they are used to connect the power from the Electrical Junction Box to the Linear Actuators.

Specifications of the illustrative waterproof electrical connectors comprise:
  2-pin male and female IP68 nut connector with 14 AWG wire,
  Length: Male extension cable 7.87 in/20 cm,
  Female extension cable 7.87 in/20 cm Total 15.
  7 in/40 cm/pair Male and Female Ends Push In 15 mm nut.

Various other types of 2-pin Waterproof Electrical Connectors may also be utilized.

Figure 21A:
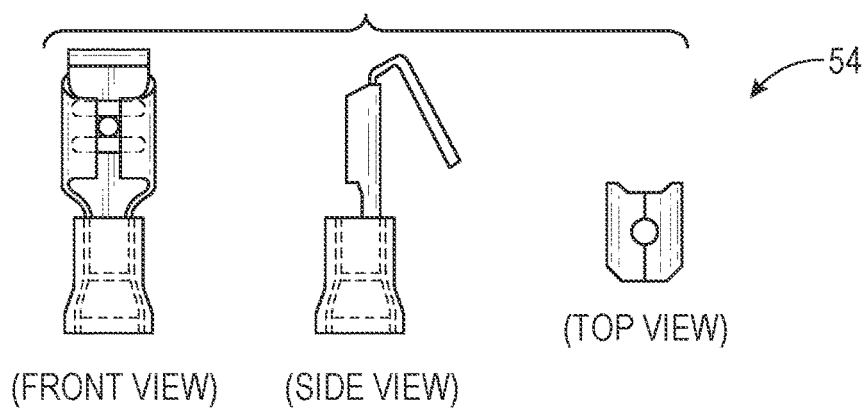

As shown in FIG. 21A-21C, are the various electrical quick connectors utilized throughout the electrical assembly connection.

Connections of Main Elements and Sub-Elements of the System

The Feed Access Control Door Mounting Bracket 10 and a Feed Access Control Door 20 bolt together to form an assembly that installs by sliding it over the open end of the protein feeder tube, where the target animal accesses the feed. Feed Access Control Door Mounting Bracket 10 using four shoulder bolts 26, two on each side. The side plates each have two threaded holes. One set serves as a hinge connection point for the Feed Access Control Door 20. A second set of threaded holes accept a shoulder bolt 26 that allows the shoulder bolts to pass through a radial arch space cut into the side plates as the Feed Access Control Door 20 opens and closes.

The assembly of the Feed Access Control Door Mounting Bracket 10 and the Feed Access Control Door 20 slides over the end of the feed distribution tube and attaches to the end of the feeding tube using button head bolt 27, a flat washer 28 and a fiber lock nut 29.

Figure 22:
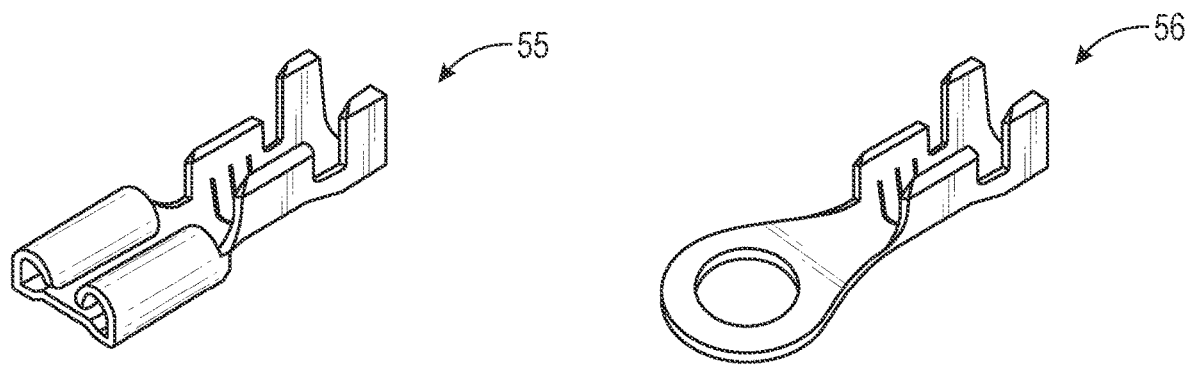
FIG. 22 is a side cross-section view of another electrical connector used in the system. Shown is a waterproof heat shrink solder style connectors 14-16 AWG used to make permanent inline connections in the electrical circuit of the invention.
Figure 22:
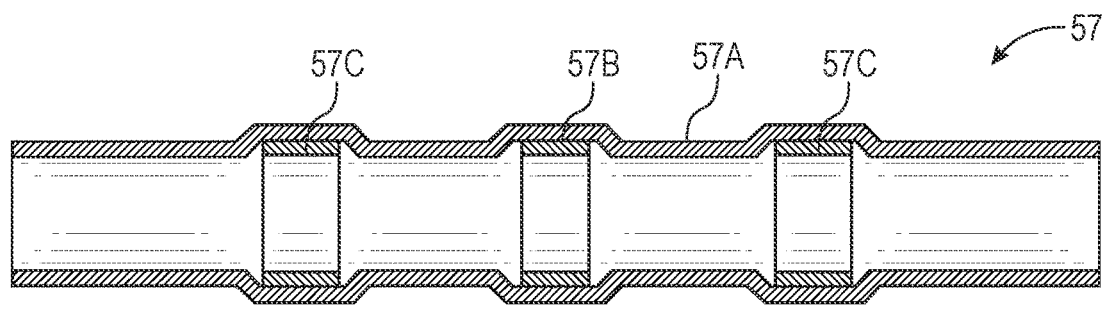

The Feed Access Control Door 20 is attached to the actuator shaft 83 via the actuator mounting bracket 23. The actuator base mounting bracket 91 is attached to the Actuator Alignment Bracket 90 with a weld. The Actuator Alignment Bracket becomes attached to the underside of each feed distribution tube using two stainless steel Hose Clamps 110. The two Hose Clamps 110 surround the feeding tube, pass through slots of the Actuator Alignment Bracket 90 (FIGS. 16 & 17), and hold the linear actuator 80 in place through pressure around the tube. A hole through the Linear Actuator shaft 83 approximately 1 inch from the end of the shaft 83 attaches the Linear Actuator 80 to the Feed Access Control Door 10 via the actuator shaft mounting bracket 86 using a connecting pin 24. A cotter key 25 is used to retain the pin. The base of the Linear Actuator is attached to the actuator base mounting bracket 91, using a connecting pin 92. A connecting pin cotter key 93 is used to retain the connecting pin. The Electrical Junction Box 40 is mounted to the Linear Actuator Alignment Bracket 90 by means of two screws. The Electrical Junction Box 40 serves as an waterproof electrical connection point for all Linear Actuators 80 on the feeder by means of the 2-stranded wire cable, 14 AWG 50 with PVC jacket 53, entering the junction box through the waterproof in/out cable interfaces 46, and connected to the actuators by the 2-cable, 14 AWG 50 which connects to the wire leads from motor 86 on the Linear Actuator with the 2-pin Waterproof Electrical Connectors 130 by use of heat shrink solder style connector 57 as illustrated in FIG. 22. The heat shrink solder style connector 57 illustrated herein comprises low-temperature solder sleeves 57B and waterproof hot-melt adhesive 57C to secure the connections of the 2-cable, 14 AWG 50 which connects to the wire leads, which in turn are all covered by heat-shrink tubing 57A, to render it all waterproof. A 2-wire cable 14 AWG 50 connects the 12-volt battery 60 to the Programmable Electronic Timer Switch using female spade terminals 55. The 14 AWG Red insulated stranded copper wire 51, connects the positive male spade terminal of the battery with a female spade terminal 55, and to the male spade connector of the Programmable Electronic Timer Switch 30, terminal A, marked (+) with a female spade terminal 55. The 14 AWG insulated black stranded copper wire 52, connects the negative male spade terminal 61 of the battery 60, with a female spade connector and to the male spade connector of the Programmable Electronic Timer Switch 30, terminal B marked (−), with female spade terminal 55, and continues on to connect to screw connector #8 of the Electromagnetic Coil Relay 12-volt, DPDT ABS Socket Base.

A second 14-gauge red insulated stranded copper wire 50 connects the positive male spade terminal of the battery 60 using female spade connector 55 to the Programmable Electronic Timer Switch spade connector marked "C" using female spade connector 55 and to screw connectors "1" and "4" of the Electromagnetic Coil Relay ABS Socket Base using ring terminals 56. A 14-gauge red insulated stranded copper wire 51, using female spade connector 55 connects from terminal "D" of the timer to screw connector #7 on the Electromagnetic Coil Relay using ring terminal 56. The 2-wire leads from the Linear Actuator DC motor 81 connect to the 2-pin male receptacle 132 of the waterproof electrical connector using the heat shrink solder style connector 57. The 2-wire leads from the 2-pin female receptacle 131 of the 2-pin waterproof electrical connector 130 connect to screw terminals #3 and #4 of the coil relay base 71 using ring terminal 56.

The Solar Panel 120 is connected to the battery 60, using positive wire lead 124, to positive battery male spade with female spade terminal 55 and the negative wire lead 125, to the negative battery male spade terminal with the female spade terminal 55. The Solar Panel 120 maintains the charge of the 12-volt battery. The 12-volt battery 60 powers the Programmable Electronic Timer Switch 30. The Programmable Electronic Timer Switch 30 energizes the circuit to the Electromagnetic Coil Relay 70, on the days, at the times and for durations input by the user through the use of the programming buttons and the LCD display. In some embodiments of the Programmable Electronic Timer Switch 30, there may be a backup trickle battery (not shown) to maintain internal dynamic memory settings of the Programmable Electronic Timer Switch 30 in the event of power loss from the primary battery 60. However, as noted earlier, in some embodiments, the programmable Electronic Timer Switch comprises static memory to maintain timer settings. In this configuration, a backup battery is not required in the event power from the primary battery is lost, as the static memory does not need to be refreshed and actually operates much faster than dynamic circuits.

As noted previously, the solar panel is configurable to maintain and recharge the primary battery and a backup battery, when a backup battery is present in the Programmable Electronic Timer Switch 30 and utilized to maintain memory settings of the timer control switch in the event power is lost from the primary battery.

As shown in FIG. 10, the battery 60 powers the Programmable Electronic Timer Switch 30. Based on the activation times set by the user, the Programmable Electronic Timer Switch 30 energizes the circuit to the Electromagnetic Coil Relay 70. The protein feeder timed-access control system requires the user to set activation times in the Programmable Electronic Timer Switch 30 to open and close the Feed Access Control Door 20. The run time for each actuation movement is typically pre-set to 20 seconds, which allows current to flow long enough for the Linear Actuator 80 to either fully extend or fully retract. The direction of movement of the Linear Actuator shaft 83 is determined by the polarity (as shown in FIG. 14) of the 12-volt signal from the Electromagnetic Coil Relay 70 to the Linear Actuator motor 81 (FIG. 15). The Linear Actuator motor 81 is automatically de-energized by the internal limit switches 82 when the shaft 83 reaches full extension (door fully closed) or full retraction (door fully open).

Setting the programmable timer 30 to the first desired Feed Access Control Door opening time will energize the Linear Actuators 80 at the time set and will cause the Linear Actuators shaft 83 to fully retract, thereby opening the Feed Access Control Door 20, providing access to the protein feed attractant. Setting the Programmable Electronic Timer Switch 30 to energize again at a selected time will cause the electromagnetic relay coil to energize the Linear Actuator 80 circuit with reversed polarity from the previous polarity, fully extending shaft 83, closing the Feed Access Control Door 20 and preventing access to the feed attractant. In a preferred embodiment, this cycle can be set to occur up to 16 times per 24 hour period. Other options are obviously available depending on the programmable electronic timer switch chosen.

All wiring is preferably outdoor rated as at least 2-wire cable, 14 AWG, 50. The 2-wire cable, 14 AWG, 50 uses female spade terminals 55 to connect the 12-volt battery 60 to the Programmable Electronic Timer Switch 30. The 14 AWG insulated Red Stranded Copper Wire 51, connects the positive male spade terminal of the 12-volt battery to the terminal post "A" power source (+) on the underside of the Programmable Electronic Timer Switch's ABS Plastic Case 34, and continues to terminal post "C". An additional section of 14 AWG insulated Red Stranded Copper Wire 51 connects to terminal post "D" 37 using a female spade terminal 14-16 AWG and continues to the #7 of the eight screw connectors 72 on the ABS plastic socket base 71 of the Electromagnetic Coil Relay 70. The 14 AWG insulated black stranded copper wire, uses a female spade terminal 55 to connect to negative male spade terminal of the 12-volt battery using female spade terminal 55 and continues to terminal post "B" power source (−) of the underside of the Programmable Electronic Timer Switch 30 ABS Plastic Case 34, and continues on to connect to the screw terminal of the ABS plastic base using a ring terminal 14-16 AWG 55.

Further, a second section of 14-gauge red insulated stranded copper wire stranded wire 50, connects the positive male spade terminal of the 12-volt battery to the Programmable Electronic Timer Switch spade connector marked "C", and to screw terminals "1" and "4" of the coil relay socket. A 14-gauge red insulated stranded copper wire with female spade terminal connects terminal "D" of the timer to screw terminal #7 on the Electromagnetic Coil Relay using a ring terminal 14-16 AWG 56. The two wire leads from motor 86, with PVC jacket 135, connect to the 2-wire pigtail 134 of the 2-pin male receptacle 132 of the waterproof electrical connector using heat shrink solder style connector 14-16 AWG, where the threaded connector nut 133, screws onto the 2-pin threaded female receptacle 131 and seals the connection from water. The 2-wire leads 134 from the 2-pin female threaded receptacle 131 of the waterproof electrical connector 130 connect to the terminal strip 12-Volt DC Positive (+) and the terminal strip 12-Volt DC negative (−), using ring terminal 14-16 AWG 56. The terminal strips 12-volt DC positive (+) and DC (−) are connected to screw terminals #3 and #4 of the coil relay base 70 using the 2-wire cable, 14 AWG and ring terminals 14-16 AWG.

Further still, as shown in FIG. 14, an Electromagnetic Coil Relay DPDT 70, with ABS plastic base 71, which alternates the relay's output between 12-volt DC negative and 12 v DC positive each time it is energized by the 12-volt negative signal received from the Programmable Electronic Timer Switch 30 as shown in FIG. 10. This action occurs based on the electrical connections to eight screw connectors 72 of the ABS plastic base 71.

As shown in FIG. 10, the electrical system 12-volt DC negative power supply is configured as a 12-volt battery 60.

Alternately, variations in the electrical system could include 24-, 36- or 48-volt electrical systems with corresponding matching electrical configurations for the other components.

Similarly, variations in the feed access control door and mounting bracket (FIGS. 2-7) could be configured for vertical, horizontal, or swinging door movement.

As noted previously, various timer configurations and styles (FIGS. 9A-9D) are also contemplated that would provide the user with more or less options and variability for programming.

FIG. 18 shows the Control Box Housing 100, constructed of 14-gauge galvanized sheet metal 101, with a hinged front door 102, adjustable height slotted mounting brackets 103, and door closure retaining latch 104, that house the 12-volt battery 60, Electromagnetic Coil Relay 70 and the Programmable Electronic Timer Switch 30. FIG. 19 shows the 12-Volt Solar Panel 120, by which the battery 60 (and the backup battery in the programmable time switch 30—[not shown]), maintains its charge. Energy is gathered from sunlight by the amorphous silicon cells 121, that are covered by the polycarbonate face 126, mounted in an aluminum frame 122. A mounting bracket 123, is part of the frame. The Solar Panel 120 has a positive wire lead 124, and a negative wire lead 125, that connect to the 12-volt AGM Sealed battery using female spade terminal 14-16 AWG 55 connected to a piggyback double spade terminal 54 on each battery male spade connector post. As shown in FIG. 10, the battery 60 powers the Programmable Electronic Timer Switch 30. Based on the activation times set by the user, the Programmable Electronic Timer Switch 30 energizes the circuit to the Electromagnetic Coil Relay 70. The protein feeder timed-access control system requires the user to set activation times in the Programmable Electronic Timer Switch 30 to open and close the Feed Access Control Door 20. The run time for each actuation movement is typically pre-set to 20 seconds, which allows current to flow long enough for the Linear Actuator 80 to either fully extend or fully retract. The direction of movement of the Linear Actuator shaft 83 (FIG. 15) is determined by the polarity of the 12-volt signal from the Electromagnetic Coil Relay 70 (FIG. 14) to the Linear Actuator motor 81. The Linear Actuator motor 81 is automatically de-energized by the internal limit switches 82 when the shaft 83 reaches full extension (door fully closed) or full retraction (door fully open).

Setting the programmable timer 30 to the first desired Feed Access Control Door opening time will energize the Linear Actuators 80 at the time set and will cause the Linear Actuators shaft 83 to fully retract, thereby opening the Feed Access Control Door 20, providing access to the protein feed attractant. Setting the Programmable Electronic Timer Switch 30 to energize again at a selected time will cause the electromagnetic relay coil to energize the Linear Actuator 80 circuit with reversed polarity from the previous polarity, fully extending shaft 83, closing the Feed Access Control Door 20 and preventing access to the feed attractant. In one preferred embodiment, this cycle can be set to occur up to 16 times per 24 hour period.

In still another preferred embodiment, the Feed Access Control Door(s) 20, are configured with one or more vent slots 27. The vent slots provide a means for the target animals to smell the protein feed attractant in the gravity fed distribution tubes when the doors are closed, thus providing an incentive for the target animals to remain in the area until the next cycle that opens the feed access door.

While preferred embodiments of the present system/apparatus have been shown and described herein, it will be obvious to those skilled in the art that such embodiments are provided by way of example only. Numerous variations, changes, and substitutions will now occur to those skilled in the art without departing from the system/apparatus. It should be understood that various alternatives to the embodiments of the system/apparatus described herein may be employed in practicing the system/apparatus. It is intended that the following claims define the scope of the system/apparatus and that methods and structures within the scope of these claims and their equivalents be covered thereby.

What is claimed is:
1. A gravity-fed feeder system comprising:
 a timed-access control system configured to increase opportunities to attract a target animal for harvesting at a feeder site during specific hours, said timed-access control system comprising:
  a programmable timer switch;
  a feed access control door assembly;
  a linear actuator;
  actuator alignment bracket and assembly mount;
  wherein said feed access control door assembly is configured for fixation to a horizontal end section of a gravity feed distribution tube, said linear actuator is configured for fixation along an exterior surface of said gravity feed distribution tube and held in place with said actuator alignment bracket and assembly mount, and wherein said programmable timer switch actuates the linear actuator to open and close the feed access control door assembly to allow a target animal access to feed within said horizontal end of the gravity feed distribution tube.

2. The timed-access control system of claim 1, further comprising:
a primary battery; and
an electromagnetic coil relay.

3. The timed-access control system of claim 2, wherein said primary battery is rechargeable.

4. The timed-access control system of claim 2, further comprising:
a solar panel;
wherein said solar panel is configured to maintain and recharge the primary battery.

5. The timed-access control system of claim 4, wherein said solar panel is also configured to maintain and recharge the programmable timer backup battery.

6. The timed-access control system of claim 2, wherein said system controls the number of times per day a target animal can access feed attractant inside dispensing tubes of the improved gravity-fed protein feeder.

7. The timed-access control system of claim 2, wherein said system controls the time of day a target animal can access feed attractant inside dispensing tubes of the improved gravity-fed protein feeder.

8. The timed-access control system of claim 2, wherein said system controls a window of time a target animal can access feed attractant inside dispensing tubes of the improved gravity-fed protein feeder.

9. The timed-access control system of claim 1, wherein said programmable timer switch further comprises:
a backup battery;
wherein said backup battery is configured to maintain memory settings of the programmable timer switch in the event power is lost from the primary battery, and
wherein said backup battery is rechargeable.

10. The timed-access control system of claim 1, further comprising:
a control box housing;
an electrical junction box; and
waterproof electric connectors;
configured to withstand year-round harsh weather conditions.

11. A gravity-fed feeder improvement system comprising a timed-access control system configured to control access to a protein feed attractant through three feed access variables consisting of:
1.) the time of the day;
2.) the number of times per day; and
3.) the duration of the time the feed attractant is accessible;
wherein the timed-access control system comprises a programmable timer switch configured to dispensed feed during hours when harvesting is legal by activation of a feed access control door assembly attached to a horizontal end section of a gravity feed distribution tube using a linear actuator attached to said feed access control door assembly and fixed along an exterior surface of said gravity feed distribution tube.

12. The gravity-fed feeder improvement system of claim 11, wherein the timed-access control system further comprises:
an actuator alignment bracket and assembly mount fixed along an exterior surface of said gravity feed distribution tube to hold the linear actuator in place;
an electromagnetic coil relay electrically connected to the linear actuator;
a rechargeable primary battery electrically connected to the timed-access control system; and
a solar panel electrically connected to the rechargeable battery;
wherein said solar panel is configured to maintain and recharge the rechargeable primary battery.

13. The gravity-fed feeder improvement system of claim 12, wherein the timed-access control system comprises a back-up battery;
wherein said backup battery is configured to maintain memory settings in the event power is lost from the primary battery, and
wherein said backup battery is rechargeable.

14. The timed-access control system of claim 13, wherein said solar panel is also configured to maintain and recharge the backup battery.

15. The timed-access control system of claim 12, further comprising:
a control box housing;
an electrical junction box; and
waterproof electric connectors;
configured to withstand year-round harsh weather conditions.

16. The timed-access control system of claim 12, further comprising scent openings in the feed access control door assembly.

17. The timed-access control system of claim 12, wherein the programmable timer switch comprises static memory to maintain timer settings.

18. The gravity-fed feeder improvement system of claim 12, wherein said programmable timer switch actuates the linear actuator to open and close the feed access control door assembly to allow a target animal access to feed within said horizontal end section of the gravity feed distribution tube.

* * * * *